W. H. KELLY.
STEREOPTICON.
APPLICATION FILED SEPT. 25, 1919.
1,400,958.
Patented Dec. 20, 1921.
4 SHEETS—SHEET 2.
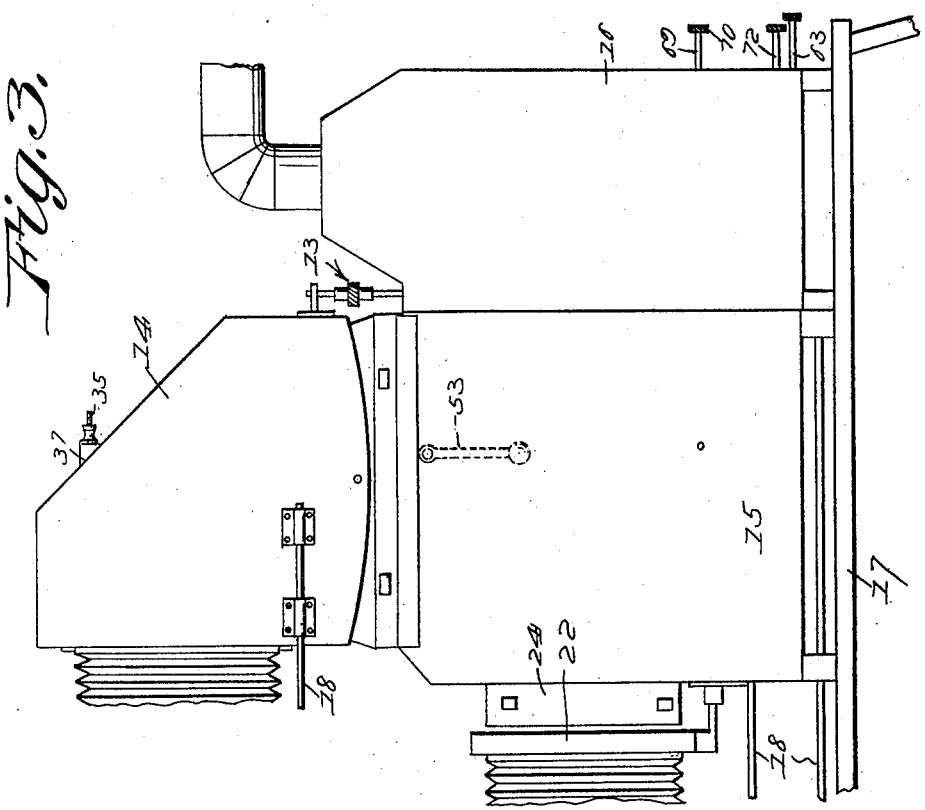
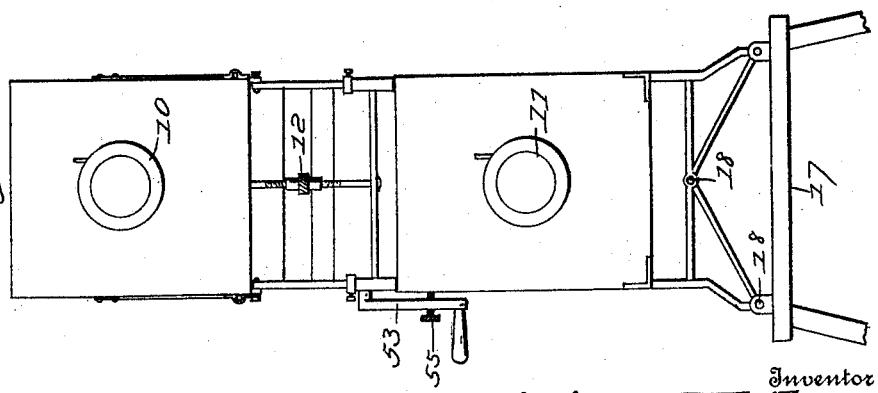
Inventor
William H. Kelly,
By
Attorney

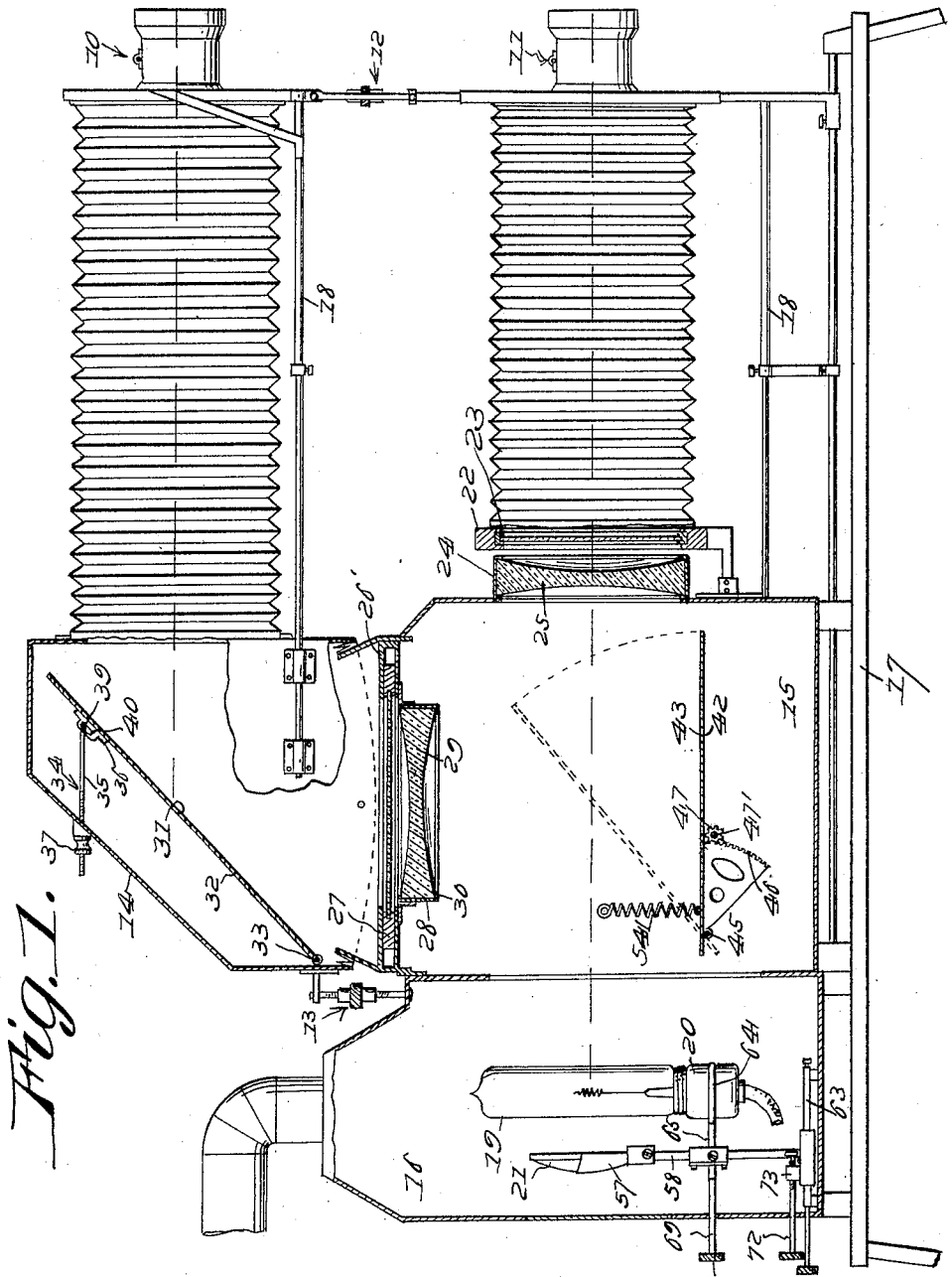

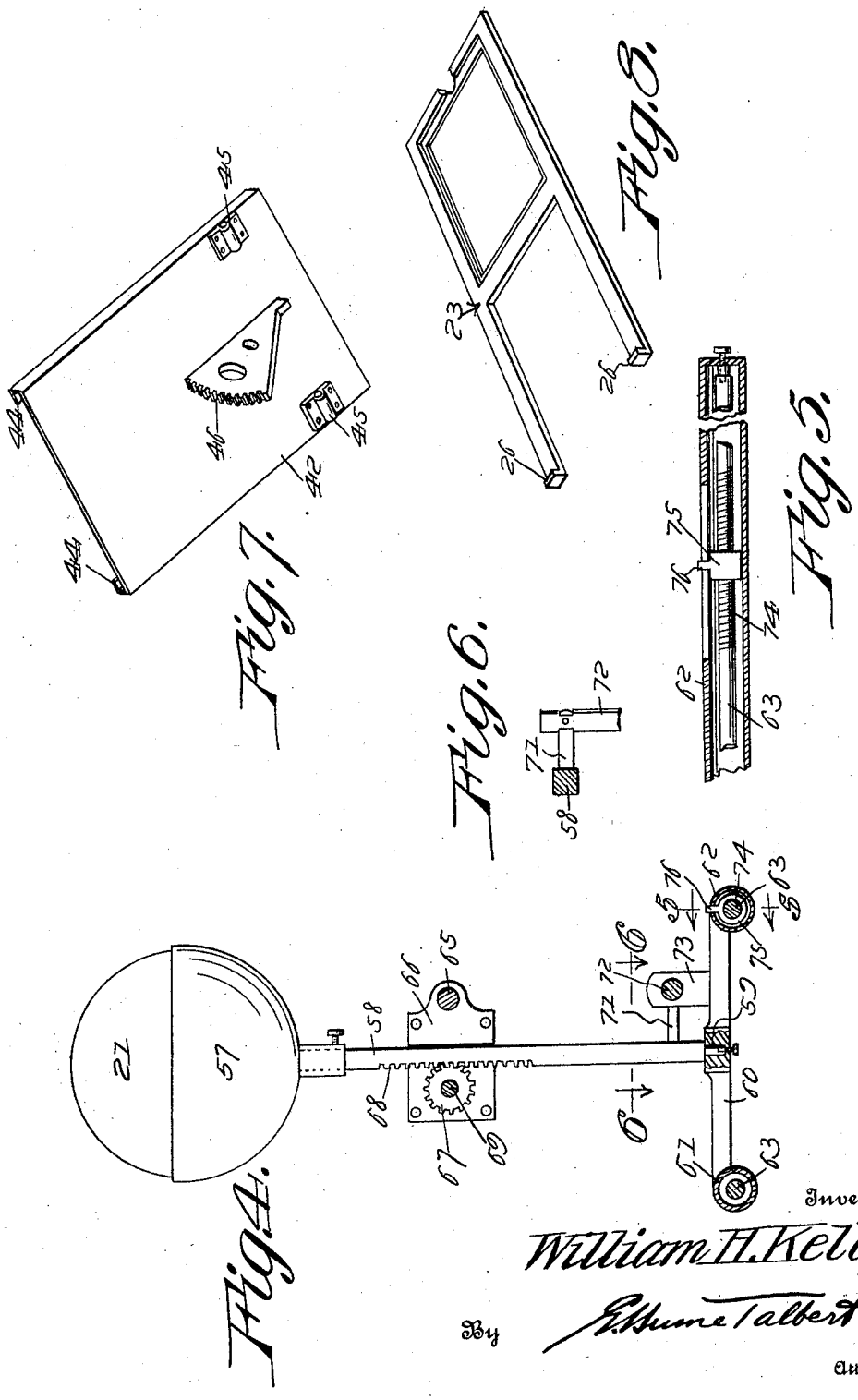

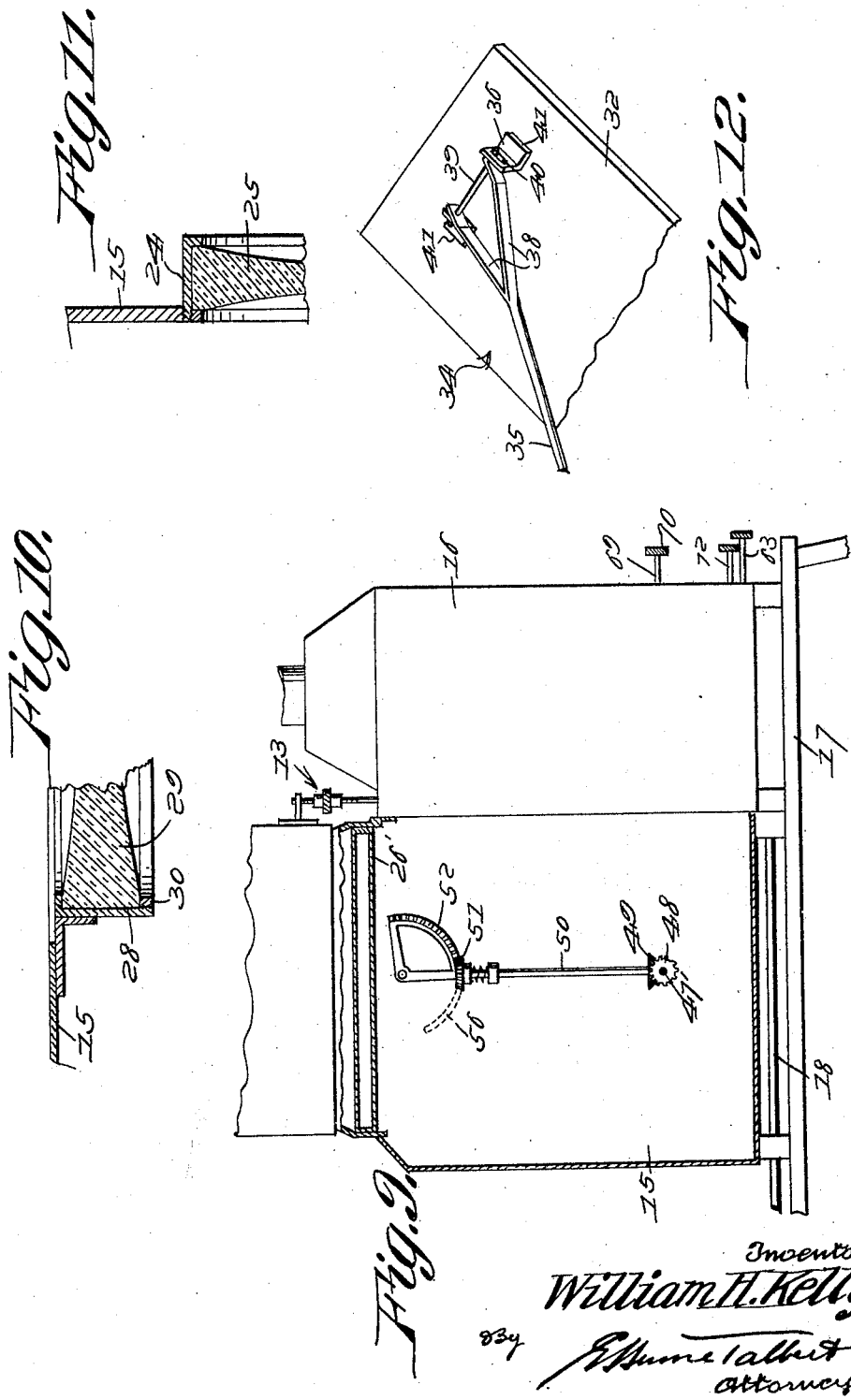

UNITED STATES PATENT OFFICE.

WILLIAM H. KELLY, OF SAN FRANCISCO, CALIFORNIA.

STEREOPTICON.

1,400,958. Specification of Letters Patent. Patented Dec. 20, 1921.

Application filed September 25, 1919. Serial No. 326,145.

*To all whom it may concern:*

Be it known that I, WILLIAM H. KELLY, a citizen of the United States of America, residing at San Francisco, in the county of San Francisco and State of California, have invented new and useful Improvements in Stereopticons, of which the following is a specification.

The object of the invention is to provide a stereopticon having interchangeably operative lenses adapted for alternate use in the display of pictorial and illustrative plates under such conditions that with a single source of light the pictures or plates may be alternately adjusted or positioned with reference to the lenses so that one may be charged while the other is being used to project a picture, to avoid the loss of time incident to the change of the plate or film holders and enable the operator to maintain a substantially continuous display upon the screen.

With these and related objects in view the invention consists in a construction and combination of parts of which a preferred embodiment is illustrated in the drawings, it being understood that changes in form and proportion may be resorted to within the scope of the claims without departing from the principles involved.

In the drawings:

Figure 1 is a longitudinal sectional view of the apparatus.

Fig. 2 is a front view.

Fig. 3 is a side view.

Fig. 4 is a detail view of the means for adjusting the lamp and reflector.

Fig. 5 is a detail section on the plane indicated by the line 5—5 of Fig. 4.

Fig. 6 is a detail horizontal section on the plane indicated by the line 6—6 of Fig. 4.

Fig. 7 is a detail view of the lower mirror carrier.

Fig. 8 is a view of one of the plate holders.

Fig. 9 is a sectional view similar to Fig. 1 looking in the opposite direction.

Fig. 10 is a detail view of a portion of the upper condenser seat.

Fig. 11 is a similar view of the lower condenser seat.

Fig. 12 is a detail view of the connection between the upper mirror carrier and the adjusting means therefor.

The interchangeable lenses 10 and 11 are arranged transversely out of alinement as for example one above the other as indicated in the drawing but are adapted to be directed toward a common object such as a remote screen (not shown) as in the ordinary practice, and to the end that the lines of projection may focus upon a common area front and rear adjusting devices 12 and 13 or the equivalent thereof may be employed. The entire structure including the housings 14 and 15 at the rear ends respectively of the lens tubes and the lamp chamber 16 in rear of said housings may be supported upon a common base 17 with provision such as guide rods 18 for the graduated extension of the lens tubes to adapt the length of the lens tubes to the distance between the same and the plane of the screen as is usual with devices of this kind.

The lamp 19 which may as illustrated be of the incandescent type is preferably arranged in alinement with one of the lens tubes so as to project light directly therethrough, the same being fitted in a socket or support 20 which in common with a reflector 21 is capable of adjustment to insure accuracy as to the line of projection. At the rear end of the lens tube which is arranged to receive the direct rays of the light from the lamp are disposed the holder 22 for a plate carrier 23, and a seat 24 for a condenser lens 25. Preferably the plate carrier as shown in detail in Fig. 8 is mounted to slide in the holder and is provided with terminal stops 26 to limit the outward movement thereof so as to avoid displacement when the carrier is drawn out to permit of the withdrawal of one plate or slide and the insertion of another. This feature is of importance in the practical operation of the device because it must be conducted under conditions of semi-darkness due to the fact that during the replacement of a slide or plate in the carrier of one lens, a picture is being displayed through the other lens.

In the wall separating the housings at the rear ends of the lens tubes is a second holder 26' adapted to receive a plate carrier 27 disposed in a plane at right angles to the line of the lens tube 10 and parallel with said holder is a seat 28 for a condenser lens 29 held in place by a cap ring 30.

Mounted in the housing for the lens tube 10, which for convenience may be termed the indirect tube as compared with the tube 11 which is disposed in alinement with the source of light and may be termed the direct tube, is a light deflecting medium such as a mirror 31 supported by a carrier 32 hinged as at 33 and provided with adjusting devices 34 by which the plane of inclination thereof may be varied with reference to the line of the indirect lens tube 10. In the construction illustrated said adjusting means consists of a rod 35 pivotally and slidingly connected as at 36 with the mirror carrier and engaged exteriorly of the housing by a thumb nut 37. The connection between said rod and the mirror carrier is indicated in detail in Fig. 12 and may consist of arms 38 carrying a pivot pin 39 engaging slots 40 formed in brackets 41.

Pivotally mounted in the lower or direct lens tube housing 15 is a carrier 42 adapted to support a mirror 43 and having guide grooves 44 at its side edges to engage said mirror, a similar construction being employed in connection with the carrier 32. Said mirror carrier 42 is pivotally mounted as at 45 and is provided with a toothed segment 46 with which meshes a pinion 47 adapted for actuation through gears 48 and 49 by a spindle 50 which in turn receives motion through a pinion 51 from a segment gear 52 adapted to be actuated by a crank 53 located conveniently at the outside of the housing within reach of the operator standing at the rear or side of the machine. The carrier 42 is adapted to be alternately positioned as indicated in full and dotted lines in Fig. 1. As indicated in full lines it is inoperative and is disposed so as not to obstruct the direct passage of light from the source through the direct lens tube whereas when disposed as indicated in dotted lines it serves to deflect rays of light from the source through the condenser 29 and a plate held by the carrier 27 to the mirror 31 by which the rays are again deflected through the indirect lens tube 10. A counterbalancing spring 54 is preferably connected with the mirror carrier 42 so as to facilitate its movement without, however, interfering with the transfer of same from one position to the other and in either of which it is adapted to remain until positively actuated by the crank under the control of the operator.

Obviously with the parts positioned and related as described a display may be made through either lens tube and during the time that a display is being made through one tube the column of light from the source is entirely cut off from the other tube and an exchange of plates may be made in the carrier relating to the second-named tube without interfering with the display through the first-named tube. After the plates have been changed a quarter turn of the crank 53 will serve to reverse the conditions by directing the column of light through the other lens tube when that previously in use may be re-supplied, and so on alternately without appreciable delay between the exposures. The deflection of the mirror 43 to direct the light to the indirect lens tube serves to cut off the light from the direct lens tube, whereas the return of said mirror to the full line position indicated in Fig. 1 permits of the column of light penetrating the direct lens tube without interference.

The amplitude of movement of the operating crank may be regulated by means of an adjustable stop 55 consisting of a thumb screw engaged with a slot 56 in the wall of the housing so that when the arm is moved to shift the mirror 43 to its deflecting position it will be checked when the mirror reaches the exact position required to properly deflect the rays of light from the source to the mirror 31.

In order that there may be an accurate adjustment of the source of light and the reflector with reference to the lens tubes the holder 57 for the reflector 21 is mounted upon a stem 58 swiveled as at 59 in a carriage 60 provided with sleeves 61 and 62 which operate upon parallel guide rods 63 disposed longitudinally of the apparatus. The lamp socket 20 is fitted in a holder ring 64 having an arm 65 supported by a carrier 66 mounted for movement upon and parallel with the stem 58, and a pinion 67 also mounted upon said carrier meshes with a rack 68 on the stem and is controlled by a spindle 69 having a milled head 70 to the end that by the operation of the pinion upon the rack the carrier 66 may be raised or lowered relative to the stem to dispose the crown of the light opposite the center of the reflector. Also extending laterally from the stem 58 is an arm 71 to which there is swiveled the extremity of an adjusting screw 72 threaded in a lug 73 rising from the carriage 60 to the end that by turning said screw the stem 58 and hence the reflector and lamp carried thereby may be angularly adjusted relative to the axis of the lens tube.

In order to provide for bodily adjustment of the lamp and reflector longitudinally of the lens tube to secure the desired focus a feed screw 74 is arranged in the guide tube 63 upon which a sleeve 62 is mounted and is engaged with a traveler nut 75 having a pin 76 engaged with said sleeve 62 whereby when said feed screw is turned the carriage 60 is moved bodily together with the stem 58 and other features carried thereby as above described.

From the foregoing description it will be obvious that a plurality of lenses may be supplied with light from a single source by the use of light directing means consisting essentially of a light reflecting medium located in angular relation with the path of light to be projected through a lens which is to be supplied by the indirect light from the source, and a light diverting medium disposed for movement in the direct path of light from the source and adapted to be arranged in a position at an angle to the path of direct rays from the source to project the same toward the said light directing medium, and furthermore that by having one of the lenses in a position to receive the direct rays from the source of light the movable light directing medium may be so mounted as to intercept the direct rays of light approaching the lens so arranged, in order to cut off the direct rays therefrom and render the direct lens inoperative during the use of the indirect lens.

What is claimed is:

1. A duplex stereopticon consisting of a duality of superposed lens tubes having lenses and provided with means for focusing said lenses on a common remote point, a housing with which the lowermost lens tube is connected, a condenser lens mounted in the forward wall of the housing, a condenser lens mounted in the top wall thereof, a source of light disposed in alinement with the lowermost lens tube, means for deflecting the light from said source through the condenser lens in the top of the housing, and means for reflecting the deflected rays through the upper lens tube.

2. A duplex stereopticon comprising a duality of housings with one superposed above the other with lens tubes and lenses operatively connected therewith, means for adjusting the upper lens tube and housing to focus the lens on a common point with the lower lens, condenser lenses mounted in the forward wall of the lower housing concentric with the lens tube thereof, a second condenser lens mounted in the upper wall of the lower housing, a pivotally mounted light diverting medium carried in the lower housing with its pivot point below the plane of the lens tube thereof, a mirror mounted in the upper housing back of the lens tube thereof, and means for swinging the said light diverting medium to obscure the lens tube of the lower housing.

3. A duplex stereopticon comprising a duality of housings with one superposed above the other with lens tubes and lenses operatively connected therewith, means for adjusting the upper lens tube and housing to focus the lens on a common point with the lower lens, condenser lenses mounted in the forward wall of the lower housing concentric with the lens tube thereof, a second condenser lens mounted in the upper wall of the lower housing, a pivotally mounted light diverting medium carried in the lower housing with its pivot point below the plane of the lens tube thereof, a mirror mounted in the upper housing back of the lens tube thereof, a segment carried on the under face of the light diverting medium, a transverse shaft carried in the lower housing and provided with gears meshing with the segment, and means for imparting rotary movement to the shaft to raise or lower the light diverting medium for the purpose specified.

4. A duplex stereopticon comprising a duality of housings with one superposed above the other with lens tubes and lenses operatively connected therewith, means for adjusting the upper lens tube and housing to focus the lens on a common point with the lower lens, condenser lenses mounted in the forward wall of the lower housing concentric with the lens tube thereof, a second condenser lens mounted in the upper wall of the lower housing, a pivotally mounted light diverting medium carried in the lower housing with its pivot point below the plane of the lens tube thereof, a mirror mounted in the upper housing back of the lens tube thereof, a transverse shaft mounted in the lower housing, means for rotating the same, operative connections between said shaft and the light diverting medium for elevating and lowering the same, and a counterbalancing spring operatively connected with the light diverting medium and placed under tension when the latter is in its lowered position.

5. A duplex stereopticon comprising a duality of housings of which one is disposed directly above the other, both of said housings being provided with lens tubes and lenses at the extremities thereof, means for focusing the two lenses on a common remote point, condenser lenses disposed respectively in the top wall and front wall of the lower housing, the condenser in said front wall being in alinement with the lens tube of the lower housing, a pivotally mounted light deflecting medium carried in the lower housing and having its pivotal point below the plane of the lens tube thereof, a mirror mounted in the upper housing and pivotally connected with the rear wall thereof, means for adjusting said mirror angularly on its pivotal connection, and means for operating said light deflecting medium to move the same to a position obscuring the condenser lens in the front wall of the lower housing or into a position out of obstructive relation with reference to said lens.

6. A duplex stereopticon comprising a duality of housings of which one is superposed upon the other, both of said housings being provided with lens tubes carrying lenses at their extremities, condenser lenses disposed respectively in the top and front wall of the lower housing, the latter condenser lens being in alinement with the lens tube of the lower housing, a light deflecting medium carried in the lower housing and having a pivotal connection with the same disposed below the plane of the lens tube of the lower housing, means for operating said light deflecting medium to move it into and out of obstructive relation with the condenser lens in the front wall of the lower housing, a mirror disposed in the upper housing and having a pivotal connection with the rear wall thereof, and means for adjusting said mirror angularly on its pivotal connection, said means comprising a rod having a combined pivotal and sliding connection with the mirror and projecting slidably through the housing, and a nut threadingly engaged with the rod and bearing against the rear wall of the housing.

7. A duplex stereopticon comprising a duality of housings of which one is superposed on the other, both of said housings being provided with lens tubes and terminal lenses, means for focusing the said terminal lenses on a common remote point, condenser lenses disposed respectively in the top and front walls of the lower housing, the latter condenser lens being in alinement with the lens tube of the lower housing, a pivotally mounted mirror disposed in the upper housing and provided with means for angularly adjusting the same, a light deflecting medium carried in the lower housing and provided with a pivotal connection therewith disposed below the plane of the lens tube thereof, a segment mounted on the lower face of said light deflecting medium, a transverse shaft mounted in the lower housing and provided with a pinion meshing with said segment, a vertically disposed shaft having a geared connection with said transverse shaft, a segment having a geared connection with said vertically disposed shaft, a crank for operating said segment, and adjustable means for limiting the movement imparted to said crank.

In testimony whereof he affixes his signature.

WILLIAM H. KELLY.